Jan. 30, 1962     L. J. KAMM     3,019,403
LOW TORQUE POSITION SENSOR
Filed Nov. 18, 1958     2 Sheets-Sheet 1
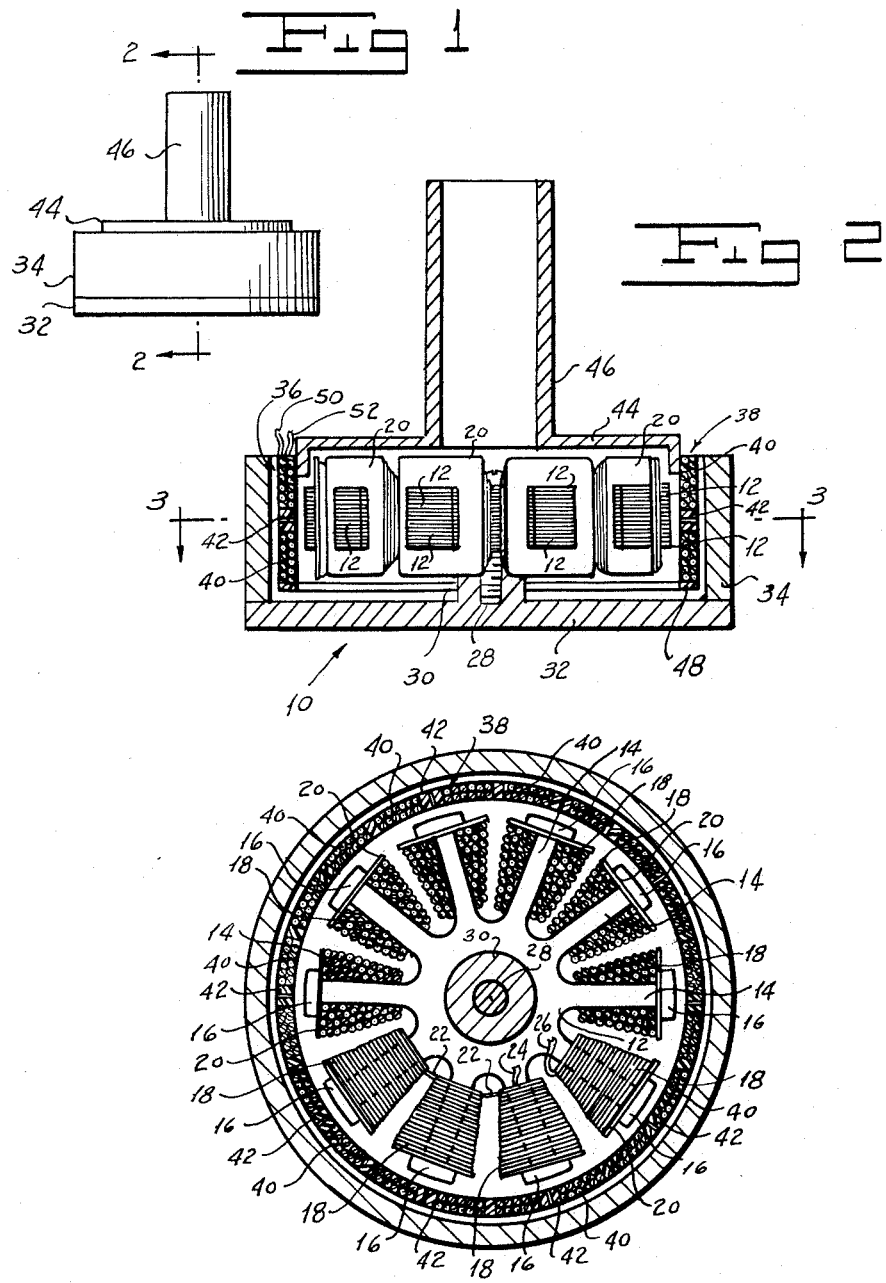
INVENTOR
LAWRENCE J. KAMM
BY
ATTORNEY Jan. 30, 1962     L. J. KAMM     3,019,403
LOW TORQUE POSITION SENSOR
Filed Nov. 18, 1958     2 Sheets-Sheet 2
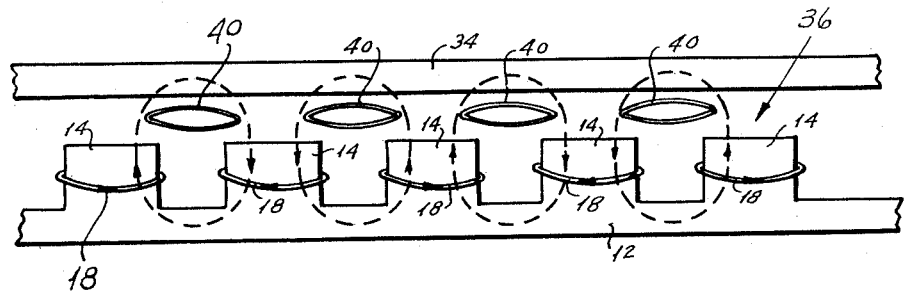
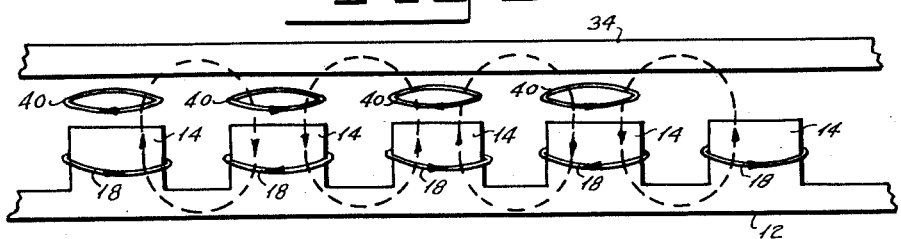
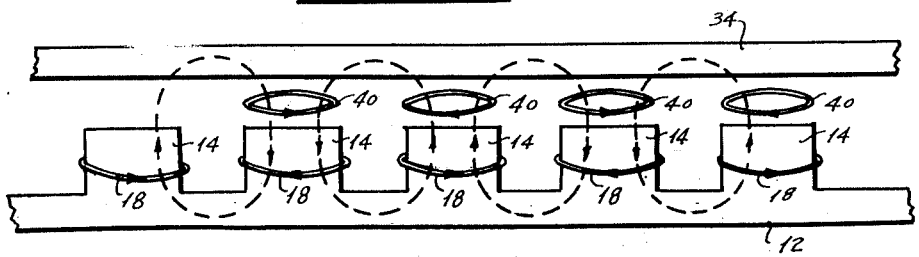
INVENTOR.
LAWRENCE J. KAMM
BY
ATTORNEY

# United States Patent Office 3,019,403
Patented Jan. 30, 1962

3,019,403
LOW TORQUE POSITION SENSOR
Lawrence J. Kamm, San Diego, Calif., assignor to United Aircraft Corporation, East Hartford, Conn., a corporation of Delaware
Filed Nov. 18, 1958, Ser. No. 774,741
7 Claims. (Cl. 336—30)

My invention relates to a position sensing device and more particularly to an improved position sensing device which overcomes disadvantages of sensing devices of the prior art.

Many devices are known in the prior art for producing an electrical signal representing the displacement of a rotatable member from a null or reference position. Certain of these devices of the prior art are employed to sense the angular displacement of a gyroscope gimbal ring or the like from a null or reference position. These devices have a magnetic stator carrying a primary winding and a magnetic rotor carrying a secondary winding. An electrical signal usually applied to the stator winding induces an electrical output signal in the rotor winding, which output signal is proportional to the angular displacement of the rotor from a null position at which the rotor output signal has a minimum value. It is desirable that these devices of the prior art have substantially no error torque at the null position so that they do not apply unwanted precessing forces on the gyroscope.

In the manufacture of position sensing devices of the prior art, precision manufacturing techniques must be employed to balance the iron-to-iron magnetic forces between the stator and rotor poles as nearly perfectly as is possible. Owing to the short iron-to-iron gaps employed in the devices of the prior art it is particularly important that the rotor and stator be concentric if magnetic unbalance is to be avoided. If these devices are not manufactured and assembled with extreme precision, eddy currents in the secondary iron produce unbalanced magnetic forces resulting on a torque at the null position of the rotor. Even with precision manufacture, some magnetic unbalance exists in devices of the prior art with the result that an error torque exists at the null position of the rotor. This error torque is a major source of error in gyroscope systems of the prior art. Further, unsymmetrical eddy current distribution in the devices of the prior art produces a quadrature component adding to the null output signal of the sensing device.

I have invented a position sensing device which overcomes the disadvantages of devices of the prior art discussed above. My device produces substantially no error torque at the null position of the rotor. It does not require the precision manufacturing techniques employed in the manufacture of devices of the prior art. My device has a low output signal at the null position.

One object of my invention is to produce a position sensing device having substantially no error torque at its null position.

Another object of my invention is to provide a position sensing device which does not require the precision manufacturing techniques employed in the prior art.

A further object of my invention is to produce a position sensing device which has a low output signal at the null position.

Other and further objects of my invention will appear from the following description.

In general my invention contemplates the provision of a position sensing device including a stator formed of magnetic material and having a plurality of poles adapted to support coils forming the primary winding of my device. A ring of magnetic material carried by the stator forms an air gap. I apply an electrical signal to the primary winding to cause a current flow in the primary winding which produces a magnetic flux in the air gap. A rotor formed of nonmagnetic material supports a plurality of coils forming the secondary winding in the air gap for movement with respect to the primary winding. The number of secondary winding coils equals the number of primary winding coils. In the null position of the rotor, the secondary winding coils are disposed between the coils of the primary winding and substantially no output signal is induced in the secondary winding. When the rotor is displaced from this null position, a signal, the magnitude of which is proportional to the amount of displacement and the phase of which is proportional to the direction of displacement, is induced in the secondary winding coils. Since the rotor carries no magnetic material, no magnetic unbalance can exist between the rotor and stator with the result that our device produces substantially no error torque in the null position.

In the accompanying drawings which form part of the instant specification and which are to be read in conjunction therewith and in which like reference numerals are used to indicate like parts in the various views:

FIGURE 1 is an elevation of one form of my position sensing device.

FIGURE 2 is a sectional view of my position sensing device drawn on an enlarged scale and taken along the line 2—2 of FIGURE 1, showing the stator winding coils in full.

FIGURE 3 is a sectional view of my position sensing device taken along the line 3—3 of FIGURE 2.

FIGURE 4 is a schematic fragmentary development of my position sensing device showing the relationship of currents and fluxes at the null position of the rotor.

FIGURE 5 is a schematic fragmentary development of my position sensing device showing the relationship of currents and flux with the rotor displaced in one direction from the null position shown in FIGURE 4.

FIGURE 6 is a schematic fragmentary development of my position sensing device showing the relationship of currents and flux in the other direction of displacement of the rotor from the null position shown in FIGURE 4.

Referring now more particularly to the drawings, the stator assembly indicated generally by the reference character 10 of my position sensing device includes a plurality of stacked, spider-like laminations 12. I form the two outer laminations 12 of an insulating material such as "Mylar," which is the registered trademark of E. I. duPont de Nemours & Company for a film of polyethylene terephthalate resin. The remaining laminations 12 of the stack are formed from a suitable magnetic material such as a steel aloy and are interleaved with thin laminations of paper. The laminations of the stack may be held together by a suitable adhesive such, for example, as an epoxy resin cement. I form the legs 14 of the spider-like laminations with enlarged ends 16 to form the stator poles of our device. The legs 14 support a plurality of respective coils 18 which are retained on the legs by end flanges 20 formed of a suitable material such as "Mylar." Conductors 22 connect the coils 18 in series to form the primary winding of my position sensing device. Respective conductors 24 and 26 provide a means for applying an electrical potential to the primary winding in a manner to be described hereinafter.

A machine screw 28 threaded into a cylindrical boss 30 formed as part of support plate 32 retains the stack of laminations 12 in position on support plate 32. I secure a ring 34 to plate 32 by any convenient means such as welding or the like to form an annular stator air gap, indicated generally by the reference character 36. I form ring 34 of any suitable magnetic material such as a steel alloy to provide a return path for the stator flux.

To form the rotor, indicated generally by the reference character 38 of my device I first wind a number of pancake windings 40 on respective cores 42 formed from a material such as an epoxy resin. I wet wind the coils 40 on cores 42 with epoxy cement and partially cure the cement until it is dry, leaving the coils 40 sufficiently flexible to permit them to conform to the shape of the rotor. To complete the rotor 38 I assemble the coils 40 together with a support plate 44 carried by a hollow shaft 46 and a support ring 48 on a suitable fixture. I fill the space between the coils 40 with a suitable plastic material such as an epoxy resin and then cure the assembly to form the finished rotor 38. I form the plate 44, shaft 46, and ring 48 from a material such as aluminum or the like. After having formed the rotor in the manner described above, I mount the rotor by any convenent means with the windings 40 disposed in the air gap 36 for movement relative to the stator windings 18. I connect the windings 40 in series and provide output conductors 50 and 52 for conducting any signal induced in the secondary winding made up by coils 40 to the external circuit.

Referring now to FIGURES 4 to 6, I apply a suitable alternating current potential to the conductors 24 and 26 to cause a current to flow in the primary winding coils 18 in the directions shown in FIGURES 4 to 6 at one instant in the alternating potential cycle. In the schematic representation of these figures I have indicated the primary winding coils 18 and the secondary winding or rotor coils 40 by single turns of wire for purposes of clarity. With the current flowing in coils 18 in the directions shown in FIGURES 4 to 6 a flux, indicated by broken lines in the figures, will be produced in the air gap 36. In the relative positions of the coils 40 with respect to the coils 18 shown in FIGURE 4 coils 40 are disposed between adjacent coils 18 with the result that the amount of flux flowing in one direction through a coil 40 substantially equals the amount of flux flowing in the other direction through the coil with the result that little or substantially no voltage is induced in the coils 40. As a result, in this relative position of the coils little or no output signal is produced on conductors 50 and 52. This is the null position of the rotor 38.

Referring to FIGURE 5, if windings 40 are displaced to the left from the position shown in FIGURE 4 to overlie respective coils 18, the flux flowing through any coil 40 is substantially all in the same direction. As a result, an electrical signal of one phase is induced in the windings 40 to produce a relatively large output signal of this phase on conductors 50 and 52. The induced voltage tends to produce a current flowing in the directions indicated by the arrowheads in FIGURE 5.

With the coils 40 displaced to the right from the position shown in FIGURE 4, as is indicated in FIGURE 6, the coils 40 overlie others of the coils 18 than those shown in FIGURE 5. In this relative position of the coils, shown in FIGURE 6, substantially all the flux flowing through a coil 40 flows in the same direction but in a direction opposite to the direction of flow of flux through a particular coil in the relative position of the coils shown in FIGURE 5. As a result, in this relative position of the coils 40 and 18, an electrical signal having a phase opposite to the phase of the electrical signal induced in windings 40 in the position shown in FIGURE 5 is induced in the windings 40. This induced potential tends to produce a current flow in the directions indicated by the arrowheads in FIGURE 6.

From the foregoing it will be seen that in the null position, shown in FIGURE 4, substantially no potential is induced in the windings 40. In the relative position of the coils 40 and 18, shown in FIGURE 5, an electrical signal tending to produce a current flow in the directions indicated by the arrowheads in FIGURE 5 is induced in coils 40. In the relative positions of the coils 40 and 18, shown in FIGURE 6, a signal tending to produce a current flow in the directions indicated by the arrowheads in the figure is induced in the coils 40. The induced electrical signals in the relative positions of the coils shown respectively in FIGURE 5 and in FIGURE 6 are of substantially the same magnitude but are of opposite phase. My position sensing device thus is phase sensitive.

From the foregoing it will be seen that the rotor 38 includes no magnetic material. Since there is no magnetic material in rotor 38, there are no forces of magnetic attraction between it and the stator. Devices of the prior art such as control transformers and microsyns depend on cancelling such forces of attraction by symmetrical opposing forces. Owing to minor defects in manufacture, perfect cancellation is not achieved. The concentration of all the magnetic circuit iron in the stator of my device eliminates the need for such cancellation. For this reason extreme precision is not required in the manufacture of our position sensing device. If the output signal produced on conductors 50 and 52 is applied to the grid of a vacuum tube, no secondary winding current is drawn and no torque exists between the rotor 38 and the stator including the poles formed by legs 14. If the output signal on conductors 50 and 52 is applied to a load, the resulting torque is an elastic centering torque, which is substantially zero at the null position. Owing to the manner in which I construct the magnetic circuit of my position sensing device, the output signal in the null position is very low.

In operation of my position sensing device in the null position, shown in FIGURE 4, a very little or substantially no output signal is induced in the secondary windings made up of coils 40. In the position of the coils 40 shown in FIGURE 5 an output signal having a given phase is produced in windings 40. In the relative position of the windings 40 and 18 shown in FIGURE 6 an output signal having a phase opposite to the phase of the signal produced in the relative position of the coils 40 and 18, shown in FIGURE 5, is induced in the windings 40. At intermediate positions of rotor 38 between the position of windings 40 shown in FIGURE 5 and the position of windings 40 shown in FIGURE 6 other than at the null position, and output signal is produced having a phase representative of the direction of the displacement and a magnitude proportional to the magnitude of the displacement.

It will be seen that I have accomplished the objects of my invention. I have produced a position sensing device having substantially no error torque at its null position. My position sensing device is particularly adapted for use in gyroscope assemblies. In this application of the device one of the major causes of gyroscope error is substantially eliminated. My device does not require the extreme precision of manufacture necessary in gyroscope position sensing devices of the prior art. My device is constructed to have a very low null output signal.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A pickoff device including in combination a stator formed of magnetic material, said stator comprising a spiderlike member having a plurality of radially extending legs forming a plurality of poles, a ring surrounding said poles to form an air gap and a magnetic member for completing the flux path from said ring to said poles, respective primary windings carried by said poles and adapted to be energized to produce a magnetic field in said air gap, a plurality of secondary windings corresponding in number to the number of primary windings, a rotor formed of nonmagnetic material for supporting said secondary windings in said air gap and means for moving said rotor and stator relative to each other, said magnetic field being adapted to induce an electrical signal in said secondary windings, said electrical signal having a magnitude proportional to the magnitude of the relative displacement of said stator and rotor and a phase representing the direction of displacement.

2. A pickoff device including in combination a stator formed of magnetic material, said stator comprising a plurality of circumferentially spaced poles and a member including a ring disposed adjacent said poles to form an annular air gap, respective primary windings carried by said poles and adapted to be energized to produce a magnetic field in said air gap, a plurality of secondary windings, a rotor formed of nonmagnetic material for supporting said secondary windings in said air gap and means for moving said rotor and stator relative to each other, said magnetic field being adapted to induce an electrical signal in said secondary windings, said electrical signal having a magnitude proportional to the magnitude and the relative displacement of said stator and rotor and a phase representing the direction of displacement.

3. A position sensing device including in combination a first member formed of magnetic material, said first member having a plurality of poles spaced by a certain distance, a primary winding carried by said first member and adapted to be energized to produce a magnetic field, a second member formed of nonmagnetic material, a plurality of secondary winding coils, means mounting said secondary winding coils on said second member with said secondary winding coils spaced by a distance which is substantially equal to an integral multiple of said certain distance and means mounting said first and second members for relative movement with said second member in said magnetic field to cause the magnitude of the voltage induced in said secondary winding coils to be a measure of the amount of displacement of the secondary member from a null position and to cause the phase of the voltage induced in said secondary windings to indicate the direction of displacement of the second member from the null position.

4. A position sensing device including in combination a first member formed of magnetic material, a plurality of primary winding coils adapted to be energized to produce a magnetic field, means mounting said primary winding coils on said first member with said primary winding coils spaced by a certain distance, a second member formed of nonmagnetic material, a plurality of secondary winding coils, means mounting said secondary winding coils on said second member with said secondary winding coils spaced by a distance which is an integral multiple of said certain distance and means mounting said first and second members for relative movement of said second member in said magnetic field to cause the magnitude of the voltage induced in said secondary winding coils to be a measure of the amount of displacement of the second member from a null position and to cause the phase of the voltage induced in the secondary winding coils to indicate the direction of displacement of the second member from a null position.

5. A position sensing device including in combination a first member formed of magnetic material, said first member providing a plurality of poles having axes and an annular air gap, a primary winding carried by said first member and adapted to be energized to produce a magnetic field in said air gap, a second member formed of nonmagnetic material, a plurality of secondary winding coils having axes, means mounting said secondary winding coils on said second member with a coil spacing which permits the axes of said coils to be substantially aligned with the axes of respective poles in a null position of said second member and means mounting said first and second members for relative movement of said second member in said air gap to cause the magnitude of the voltage induced in said secondary winding coils to be a measure of the amount of displacement of the second member from said null position and to cause the phase of the voltage induced in said secondary windings to indicate the direction of displacement of said second member from said null position.

6. A position sensing device as in claim 5 in which the number of secondary winding coils is equal to the number of first member poles.

7. A position sensing device including in combination a first member formed of magnetic material, said first member having a plurality of poles spaced by a certain distance, a primary winding carried by said first member and adapted to be energized to produce a magnetic field, a second member formed of nonmagnetic material, a plurality of secondary winding coils, means mounting said secondary winding coils on said second member with said secondary winding coils spaced by a distance which is substantially equal to the distance between said poles, means mounting said first and second members for relative movement with the second member in said magnetic field to cause the magnitude of the voltage induced in said secondary winding coils to be a measure of the amount of displacement of the secondary member from a null position and to cause the phase of the voltage induced in said secondary windings to indicate the direction of displacement of the second member from the normal position.

References Cited in the file of this patent
UNITED STATES PATENTS

| | | |
|---|---|---|
| 2,269,453 | Gayhart | Jan. 13, 1942 |
| 2,925,569 | Schaberg | Feb. 16, 1960 |